US010620026B2

(12) United States Patent
Ueberschlag et al.

(10) Patent No.: US 10,620,026 B2
(45) Date of Patent: Apr. 14, 2020

(54) ULTRASONIC TRANSDUCER FOR APPLICATION IN AN ULTRASONIC, FLOW MEASURING DEVICE OR IN AN ULTRASONIC, FILL-LEVEL MEASURING DEVICE

(71) Applicant: Endress+Hauser Flowtec AG, Reinach (CH)

(72) Inventors: Pierre Ueberschlag, Saint-Louis (FR); Andreas Berger, Hasel-Glashütten (DE); Michal Bezdek, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/086,503

(22) PCT Filed: Feb. 13, 2017

(86) PCT No.: PCT/EP2017/053114
§ 371 (c)(1),
(2) Date: Sep. 19, 2018

(87) PCT Pub. No.: WO2017/182154
PCT Pub. Date: Oct. 26, 2017

(65) Prior Publication Data
US 2019/0101423 A1    Apr. 4, 2019

(30) Foreign Application Priority Data
Mar. 22, 2016 (DE) .................. 10 2016 105 338

(51) Int. Cl.
*G01F 1/66* (2006.01)
*G06F 1/20* (2006.01)
(52) U.S. Cl.
CPC .............. *G01F 1/662* (2013.01); *G06F 1/206* (2013.01)

(58) Field of Classification Search
CPC ........................................................ G01F 1/66
See application file for complete search history.

(56) References Cited

U.S. PATENT DOCUMENTS 5,437,194 A     8/1995  Lynnworth
8,132,469 B2 *  3/2012  Allen ................ G01F 1/662
                                         73/861.18
(Continued)

FOREIGN PATENT DOCUMENTS

CN      1352743 A    6/2002
CN    102065361 A    5/2011
(Continued)

OTHER PUBLICATIONS

Search Report for German Patent Application No. 10 2016 105 338A, German Patent Office, dated May 17, 2017, 10 pp.
(Continued)

*Primary Examiner* — Jewel V Dowtin
(74) *Attorney, Agent, or Firm* — Christopher R. Powers; PatServe

(57) ABSTRACT

The invention relates to an ultrasonic transducer with a housing, in which a transducer element for producing and detecting ultrasonic signals and an acoustic transformer are arranged, wherein the acoustic transformer is acoustically and mechanically coupled with the transducer element. The housing includes at least one housing body, which has at least one housing chamber with a housing wall, which housing wall at least partially surrounds the acoustic transformer, wherein the housing is acoustically and mechanically connected with a measuring tube wall or a container wall and wherein the acoustic transformer is connected or connectable mechanically with the housing via a lateral
(Continued)

surface of the acoustic transformer by means of a first acoustic insulation, especially an annular first acoustic insulation.

16 Claims, 3 Drawing Sheets

(56) References Cited

U.S. PATENT DOCUMENTS

| | | | |
|---|---|---|---|
| 8,181,534 B2* | 5/2012 | Allen | G01F 1/662 |
| | | | 73/861.18 |
| 8,731,846 B2* | 5/2014 | Karbula | G01D 9/005 |
| | | | 702/30 |
| 2003/0164661 A1 | 9/2003 | Pfeifer | |
| 2013/0014592 A1 | 1/2013 | Mueller et al. | |
| 2013/0167654 A1 | 7/2013 | Ueberschlag et al. | |
| 2015/0308870 A1 | 10/2015 | Gottlieb et al. | |
| 2018/0245958 A1* | 8/2018 | Bezdek | B06B 1/0666 |

FOREIGN PATENT DOCUMENTS

| | | |
|---|---|---|
| CN | 103097865 A | 5/2013 |
| DE | 1443415 A1 | 6/1996 |
| DE | 10205545 A1 | 6/2003 |
| DE | 102010000967 A1 | 7/2011 |
| EP | 1340964 A1 | 9/2003 |
| FR | 2952221 A1 | 5/2011 |
| JP | 2001215139 A | 8/2001 |
| WO | 2014073181 A1 | 5/2014 |

OTHER PUBLICATIONS

Examination Report for German Patent Application No. 10 2016 105 3384, German Patent Office, dated Jan. 5, 2017, 6 pp.

* cited by examiner

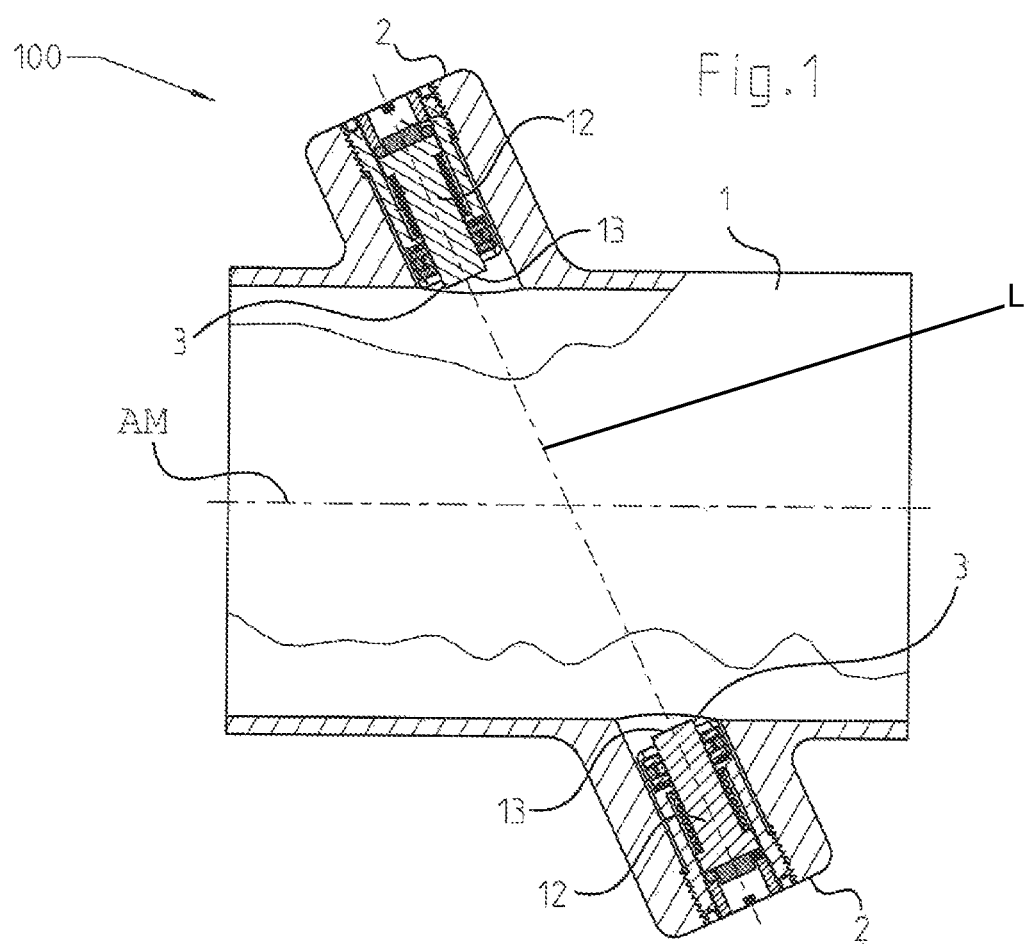

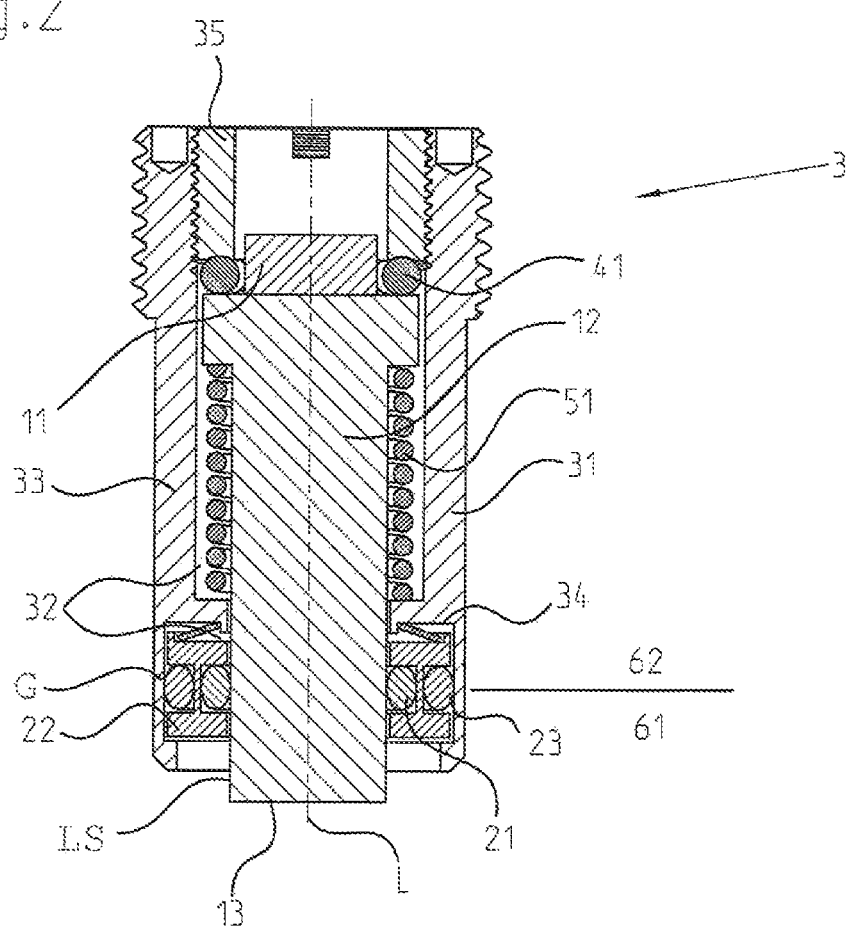

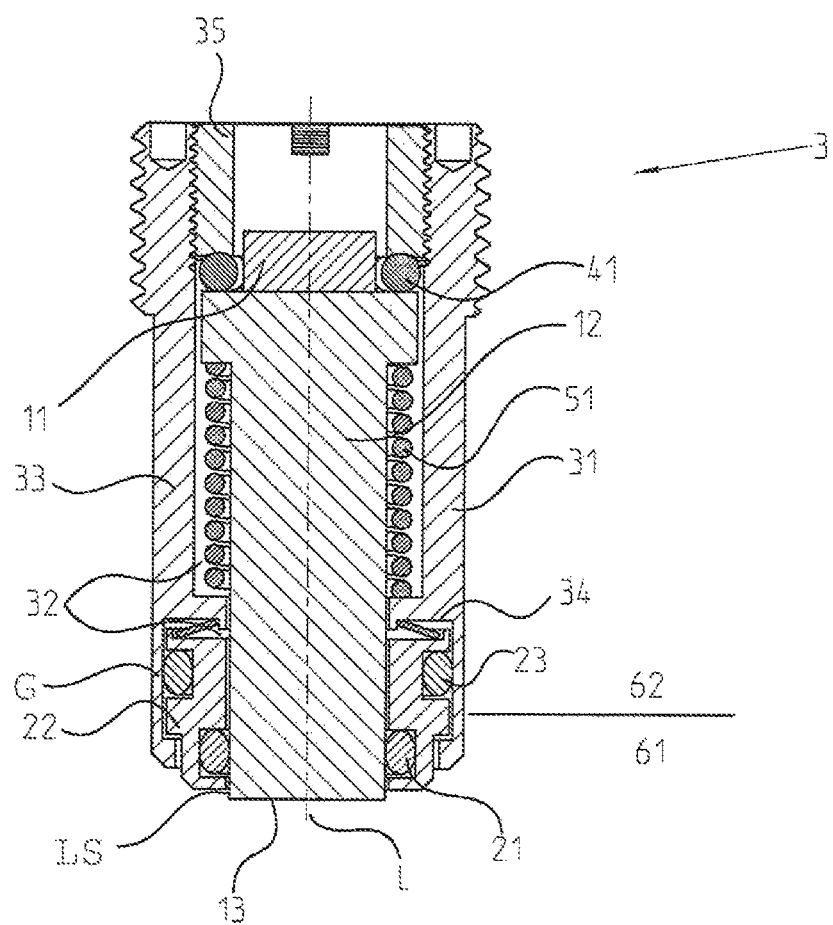

ULTRASONIC TRANSDUCER FOR APPLICATION IN AN ULTRASONIC, FLOW MEASURING DEVICE OR IN AN ULTRASONIC, FILL-LEVEL MEASURING DEVICE

CROSS-REFERENCE TO RELATED APPLICATIONS

The present application is related to and claims the priority benefit of German Patent Application No. 10 2016 105 338.4, filed on Mar. 22, 2016 and International Patent Application No. PCT/EP2017/053114, filed on Feb. 13, 2017, the entire contents of which are incorporated herein by reference.

TECHNICAL FIELD

The invention relates to an ultrasonic transducer for application in an ultrasonic, flow measuring device for measuring flow velocity or volume flow of media in a pipeline or for application in an ultrasonic, fill-level measuring device for measuring fill level of media in a container.

BACKGROUND

Ultrasonic transducers have been used for a long time in numerous variants for measuring flow velocities or fill levels. A significant, often reoccurring problem in the use of ultrasonic transducers is the undesired interaction between an ultrasonic transducer element for producing and/or detecting ultrasonic signals and a measuring apparatus, which interaction results from the contact produced via the installation of the ultrasonic transducer into the measuring apparatus. The interaction leads to transfer of oscillations of the measuring apparatus to the ultrasonic transducer element, which superimpose on the measurement signal, such that the registering of measured values becomes difficult. The oscillations of the measuring apparatus can, in such case, come from a remote location, or also from post-pulse oscillations produced by the ultrasonic transducer element or from additional ultrasonic transducers. Post-pulse oscillations arise from sound decay or reverberation of the ultrasonic transducer element after producing an ultrasonic signal radiated into a medium.

To solve this problem, for example, a housing of the ultrasonic transducer containing the ultrasonic transducer element is insulated acoustically from a meter body by means of a cladding; see US2015308870A1. This solution has the disadvantage that, because of not being able to produce a perfect acoustic insulation, all eigenoscillations of the housing can be excited and therewith the ultrasonic transducer element can be disturbed.

Another approach for avoiding the problem of interaction between the ultrasonic transducer element and the measuring apparatus is disclosed in the document, EP1340964A1. An ultrasonic transducer arrangement with an ultrasonic transducer element and a bending plate radiating ultrasonic waves is held by a filter, wherein the filter provides for an acoustic insulation of an ultrasonic transducer element from a housing. The filter, in such case, contacts the bending plate on its outer edge and thus strongly influences the oscillation characteristics of the bending plate. Moreover, the contact of an acoustic filter with a strongly oscillating bending plate is disadvantageous for an acoustic decoupling of the ultrasonic transducer from the housing.

SUMMARY

An object of the invention, consequently, is to provide an ultrasonic transducer with an acoustic insulation, which avoids disturbances resulting from housing oscillations, wherein the acoustic insulation does not contact a radiating surface. The object of the invention is achieved by an ultrasonic transducer as defined in the independent claim 1.

The ultrasonic transducer of the invention comprises:

at least one transducer element for producing and/or detecting ultrasonic signals;

at least one acoustic transformer, wherein the acoustic transformer is acoustically and mechanically coupled with the transducer element;

wherein the acoustic transformer has a radiating surface and a longitudinal axis, which intersects the radiating surface; and at least one housing having at least one housing body, which housing body has at least one housing chamber with a housing wall, which housing wall at least partially surrounds the acoustic transformer, wherein the housing is acoustically and mechanically connected with a measuring tube wall or a container wall, and wherein the acoustic transformer is connected or connectable mechanically with the housing via a lateral surface of the transformer by means of a first acoustic insulation, especially an annular first acoustic insulation, which first acoustic insulation is contactable with the medium.

In an embodiment of the ultrasonic transducer, a first region facing the medium is separated in the housing chamber from a second region facing away from the medium media tightly by the first acoustic insulation.

In an embodiment of the ultrasonic transducer, the first acoustic insulation includes a first insulator, a second insulator and a third insulator, wherein the first insulator is in contact with the acoustic transformer, and wherein the third insulator is in contact with the housing, and wherein the second insulator is arranged between the first insulator and the third insulator.

In an embodiment of the ultrasonic transducer, the insulators are, in each case, manufactured of a material of the following material groups:

metal, ceramic, synthetic material, wherein the synthetic material is especially an elastomer, wherein contacting insulators have different acoustic impedances.

In an embodiment of the ultrasonic transducer, the second insulator is held at least by the first insulator and/or the third insulator.

In an embodiment of the ultrasonic transducer, the second insulator is oscillatably seated.

In an embodiment of the ultrasonic transducer, the housing wall includes in the second region a first axial stop, which is adapted in the case of high pressures of the medium to support the second insulator.

In an embodiment of the ultrasonic transducer, the housing wall includes in the second region a guide, which is adapted to guide the second insulator in the axial direction.

In an embodiment of the ultrasonic transducer, the at least one insulator protrudes axially beyond the radiating surface of the acoustic transformer.

In an embodiment of the ultrasonic transducer, the acoustic transformer, the first acoustic insulation and the housing are essentially rotationally symmetric relative to the longitudinal axis.

In an embodiment of the ultrasonic transducer, the housing includes on the end facing away from the medium a second axial stop, which is mechanically coupled with the acoustic transformer and/or the transducer element, and wherein the second axial stop is adapted to hold the acoustic transformer and/or the transducer element.

In an embodiment of the ultrasonic transducer, the ultrasonic transducer includes a second acoustic insulation, which is adapted mechanically to connect the second axial stop with the acoustic transformer and/or with the transducer element and acoustically to decouple the second axial stop from the acoustic transformer and/or from the transducer element.

In an embodiment of the ultrasonic transducer, the transducer element is a piezotransducer.

In an embodiment of the ultrasonic transducer, the housing is pressure bearing.

In an embodiment of the ultrasonic transducer, the acoustic transformer and/or the transducer element are biased against the second axial stop by means of a spring element.

Thus, the present invention provides an ultrasonic transducer element acoustically isolated from a housing of an ultrasonic transducer.

BRIEF DESCRIPTION OF THE DRAWINGS

The invention will now be explained in greater detail based on examples of forms of embodiment illustrated in the appended drawing, the figures of which show as follows:

FIG. 1 shows an ultrasonic, flow measuring device having two ultrasonic transducers of the invention;

FIG. 2 shows a schematic longitudinal section of a form of embodiment of an ultrasonic transducer of the invention; and FIG. 3 shows a schematic longitudinal section of an additional form of embodiment of an ultrasonic transducer of the invention.

DETAILED DESCRIPTION

FIG. 1 shows an ultrasonic, flow measuring device 100, which works according to the travel time or travel time difference principle, wherein the ultrasonic, flow measuring device includes a measuring tube 1 with an essentially straight measuring tube axis AM and two connections 2 for ultrasonic transducers 3 of the invention. The ultrasonic transducers 3 are, in such case, so arranged in the measuring tube that acoustic transformers 12 of the ultrasonic transducer 3 have a shared longitudinal axis L, wherein the longitudinal axis L is inclined relative to the measuring tube axis AM, so that a component of a propagation direction of an ultrasonic signal emitted by the ultrasonic transducers 3 is directed in or counter to the flow direction of a medium flowing through the measuring tube 1. The application of the travel time difference principle utilizes the fact that an ultrasonic signal travel time of an ultrasonic signal traveling against the flow direction of the medium flowing through the measuring tube is somewhat greater than an ultrasonic signal travel time of an ultrasonic signal traveling in the flow direction of the medium. The travel time difference between the ultrasonic signals depends on flow velocity, so that the flow velocity of the medium in the measuring tube can be determined from the travel time difference.

FIG. 2 shows a detailed longitudinal section of an ultrasonic transducer 3 of the invention having a housing, which is composed of a housing body 31, which is essentially rotationally symmetric relative to the longitudinal axis L, a housing chamber 32 and a housing wall 33. Housing wall 33 surrounds a transducer element 11, for example, a piezotransducer element, which is adapted for producing and detecting ultrasonic signals. Housing wall 33 further partially surrounds an acoustic transformer 12, which is essentially rotationally symmetric relative to the longitudinal axis L, wherein a front end radiating surface 13 of the acoustic transformer 12 protrudes out from the housing chamber 32. Acoustic transformer 12 can, however, also be so embodied that it does not protrude out from the housing chamber 32. Acoustic transformer 12 is acoustically and mechanically coupled with the transducer element 11, wherein the coupling can be effected by an adhesive connection or by a bias against a second acoustic insulation by means of a spring element 51. An ultrasonic signal produced by the transducer element 11 is received by the acoustic transformer and led to the radiating surface 13. The radiating surface 13 transmits the ultrasonic signal at least partially into the medium flowing through the measuring tube 1. Analogously, the radiating surface 13 receives an ultrasonic signal incoming via the medium and conducts it to the transducer element 11, which converts the ultrasonic signal into an electrical signal.

In practice, the ultrasonic signal incoming to the transducer element includes superimposed disturbing influences, which make the registering of a measured variable difficult. Of utmost importance for an effective functioning of an ultrasonic transducer 3 is, consequently, an extensive minimizing of these disturbing influences. A large part of these disturbing influences is caused by transmission of the body sound of the measuring tube 1 via the housing 31 to the transducer element 11 of the ultrasonic transducer. An essential feature of the invention is, consequently, to decouple the acoustic transformer 12 and the transducer element 11 acoustically from the housing 31 using a first acoustic insulation, wherein the insulation is, furthermore, adapted to hold the acoustic transformer radially, in order that the radiating direction remains constant. In the example of an embodiment of the ultrasonic transducer of the invention illustrated in FIG. 2, the first acoustic insulation includes a first insulator 21, a second insulator 22 and a third insulator 23, wherein the insulators are essentially rotationally symmetric relative to the longitudinal axis L. Insulator 21 is in contact with a lateral surface LS of the acoustic transformer 12, insulator 23 is in contact with the housing wall 33, and insulator 22 is arranged between the insulators 21 and 23 and is at least partially held by insulators 21 and 23, wherein the insulators 21 and 23 are radially clamped. Insulators 21, 22 and 23 are, in such case, in each case, manufactured of a metal, such as, for example, steel, titanium or aluminum or a ceramic material or a synthetic material, wherein the insulator 22 is preferably manufactured of a metal or a ceramic. In order to suppress the movement of disturbance signals between housing and acoustic transformer, the housing, the insulators and the acoustic transformer have preferably different acoustic impedances. Because of reflections of the disturbance signal caused thereby and the therewith increased residence time of the disturbance signal in the first acoustic insulation, the disturbance signal is more strongly damped. As a further result, the disturbance signal is time expanded, which results in a shifting of the disturbing signal frequencies to lower values. Thus, the disturbance signal can by choice of insulators 21, 22, 23 with different impedances be moved to a less disturbing frequency range. Furthermore, the insulators 21 and 23 have an essentially elliptically shaped cross section. Disturbing influences, which move from the measuring tube 1 via the housing 31 of the ultrasonic transducer to the insulator 23, are forwarded from there only to a small extent to the insulator 22, since the geometric properties of the elliptically shaped cross section impede the forwarding of acoustic disturbing influences. In the case of application of acoustically damping materials, such as, for example, elastomers, the forwarding of disturbing influences can be further suppressed. Analogously, insulator 21 hinders the forwarding of disturbing influences from the insulator 22 to the acoustic transformer 12. Insulator 22 is, in such case, oscillatably seated, so that it can store, in the form of oscillatory energy, signals coming from the insulators 21 and 23 and give such off slowly, such that disturbing signal transfer between the insulators 21 and 23 is supplementally hindered and slowed. Housing wall 33 includes a first axial stop 34, which limits retreat of the acoustic insulator 22 due to high media pressure. The acoustic insulator can, in such case, be biased by a resilient element, so that the insulator 22 in the case of decreased media pressure is pushed toward the medium. Insulator 22 has a cross section, such that the first insulator 21 and/or the third insulator 23 at least partially surrounded by the second insulator 22 and so are held by the second insulator 22 in the case of high media pressures. Housing wall 33 can have on the end facing the medium an additional axial stop, which prevents the insulation from falling out of the housing 31. The housing is, furthermore, formed as a guide, which guides the second insulator 22 in the case of movement parallel to the longitudinal axis L.

The first acoustic insulation is a media tight insulation, such that the housing chamber 32 is separated into a first region 61 facing toward the medium and a second region 62 facing away from the medium, wherein the region 61 contains the medium and wherein the region 62 is free of the medium flowing through the measuring tube. The transfer of ultrasonic signals to the housing 31, ultrasonic signals emitted by the transducer element 11, is correspondingly hindered in the above described manner. The first acoustic insulation cares thus for a reduction of disturbing influences on the transducer element coming from the measuring tube 1 and also for a reduction of ultrasonic signals moving from the transducer element 11 via the housing 31 into the measuring tube.

The ultrasonic transducer in FIG. 2 includes on the end opposite the medium a second acoustic insulation 41, wherein the housing wall 33 has a second axial stop 35, against which the acoustic transformer 12 with the transducer element 11 is pressed by a spring element 51, wherein the acoustic transformer 12 is held by the second axial stop. The second axial stop 35 is thus pressure bearing. The second acoustic insulation 41 can, in such case, involve spherical or annular elements. Spherical elements have the advantage that they spatially widely distribute disturbance signals entering at contact points, and entering disturbance signals can only leave where there is a small point of emergence. Thus, a great part of the disturbance signal energy remains in the spherical elements and is dissipated by damping. In the case of annular elements, the spatially wide distribution is assured in at least one spatial dimension.

The ultrasonic transducer in FIG. 3 differs from the ultrasonic transducer illustrated in FIG. 2 in that the arrangement of the insulators 21, 22, 23 in FIG. 3 has an asymmetric structure. Asymmetric structuring allows influencing of the disturbance signal paths by the first acoustic insulation. With favorably selected asymmetric structures in combination with selected manufacturing materials of the insulators 21, 22, 23, the transfer of disturbance signals can be further suppressed. Using cross sections with several corners and edges, such as in the case of insulator 22 in FIG. 3, a disturbance signal traveling through such the insulator 22 is diffracted and reflected multiple times within the insulator, such that destructive interferences can suppress transfer of the disturbance signal.

The ultrasonic transducer 3 of the invention thus includes a first acoustic insulation, which reduces disturbing influences on the transducer element 11 in a number of ways.

The invention claimed is:

1. An ultrasonic transducer for measuring flow velocity or volume or fill level of a medium, the ultrasonic transducer comprising:
   a transducer element configured to produce and/or detect ultrasonic signals;
   an acoustic transformer acoustically and mechanically coupled with the transducer element and including a radiating surface and a longitudinal axis, which intersects the radiating surface;
   a housing having a housing body including a housing chamber with a housing wall, the housing wall at least partially surrounding the acoustic transformer, wherein the housing is acoustically and mechanically connected with a measuring tube wall or a container wall; and
   a first acoustic insulation disposed within the housing and adapted to be contactable by the medium, wherein the acoustic transformer is connected or connectable mechanically with the housing via a lateral surface of the acoustic transformer using the first acoustic insulation.

2. The ultrasonic transducer of claim 1, wherein the first acoustic insulation has an annular form.

3. The ultrasonic transducer of claim 1, wherein the housing chamber includes a first region adjacent the medium and a second region opposite the medium, the first region separated from the second region by the first acoustic insulation such that medium cannot intrude into the second region.

4. The ultrasonic transducer of claim 1, wherein the first acoustic insulation includes a first insulator, a second insulator and a third insulator, wherein the first insulator is in contact with the acoustic transformer, the third insulator is in contact with the housing, and the second insulator is disposed between the first insulator and the third insulator.

5. The ultrasonic transducer of claim 4, wherein the first insulator, the second insulator and the third insulator each have different acoustic impedances and are each manufactured of a metal, a ceramic or an elastomeric material.

6. The ultrasonic transducer of claim 4, wherein the second insulator is held at least by the first insulator and/or the third insulator.

7. The ultrasonic transducer of claim 4, wherein the second insulator is oscillatably seated.

8. The ultrasonic transducer of claim 4, wherein, in the second region, the housing wall includes a first axial stop configured to support the second insulator against the medium at high pressures.

9. The ultrasonic transducer of claim 4, wherein, in the second region, the housing wall includes a guide configured to guide the second insulator in the axial direction.

10. The ultrasonic transducer of claim 4, wherein at least one of the first insulator, second insulator and/or third insulator protrudes axially beyond the radiating surface of the acoustic transformer.

11. The ultrasonic transducer of claim 1, wherein the acoustic transformer, the first acoustic insulation and the housing are essentially rotationally symmetric relative to the longitudinal axis.

12. The ultrasonic transducer of claim 1, wherein the housing includes, on an end opposite the medium, a second axial stop mechanically coupled with the acoustic transformer and/or the transducer element, and wherein the second axial stop is configured to hold the acoustic transformer and/or the transducer element.

13. The ultrasonic transducer of claim 12, further comprising a second acoustic insulation configured mechanically to connect the second axial stop with the acoustic transformer and/or with the transducer element and acoustically to decouple the second axial stop from the acoustic transformer and/or from the transducer element.

14. The ultrasonic transducer of claim 12, wherein the acoustic transformer and/or the transducer element are biased against the second axial stop by a spring element.

15. The ultrasonic transducer of claim 1, wherein the transducer element is a piezotransducer.

16. The ultrasonic transducer of claim 1, wherein the housing is pressure bearing.

* * * * *